United States Patent [19]

Smith et al.

[11] 4,180,943

[45] Jan. 1, 1980

[54] DUAL LOST MOTION MECHANISM FOR AN AIRCRAFT DOOR

[75] Inventors: Hugh D. Smith, Huntington Beach; David M. Blackmore, La Palma, both of Calif.

[73] Assignee: McDonnell Douglas Corporation, Long Beach, Calif.

[21] Appl. No.: 942,879

[22] Filed: Sep. 15, 1978

[51] Int. Cl.² .............................................. E05F 11/54
[52] U.S. Cl. ...................................... 49/279; 49/317; 49/319; 244/129.5
[58] Field of Search ................... 49/279, 249, 40, 103, 49/319, 317; 74/471 R; 244/129.5

[56] References Cited

U.S. PATENT DOCUMENTS

| 3,051,280 | 8/1962 | Bergman et al. ............. 49/319 X |
| 3,640,362 | 2/1972 | Six ................................. 74/471 R X |
| 3,900,965 | 8/1975 | Mummert ....................... 49/103 |

*Primary Examiner*—Kenneth Downey
*Attorney, Agent, or Firm*—George W. Finch; Walter J. Jason; Donald L. Royer

[57] ABSTRACT

A pair of four-bar linkages employing lost motion incorporated into an aircraft door construction which simultaneously are operable by a main door handle so that the output crank of each linkage has a dwell which is sequenced such that the operation of the associated latches and door hinges are properly timed and sequenced for opening and closing of the door.

5 Claims, 5 Drawing Figures

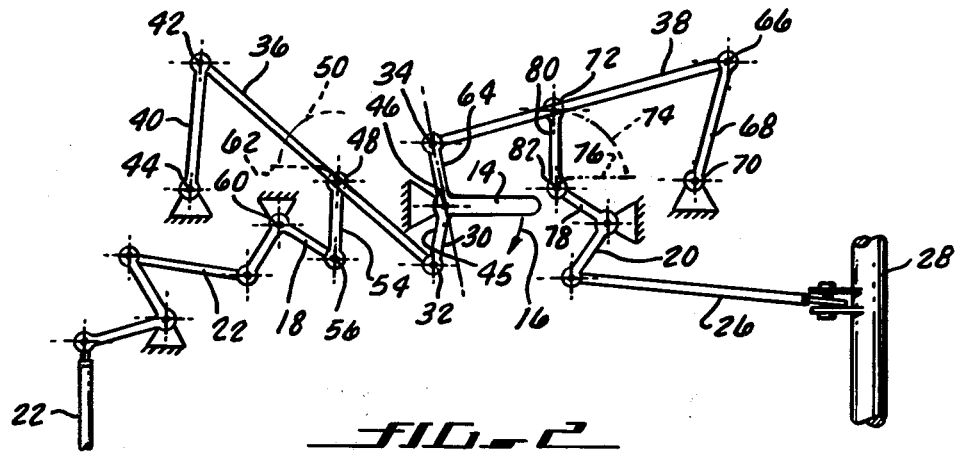
FIG_2
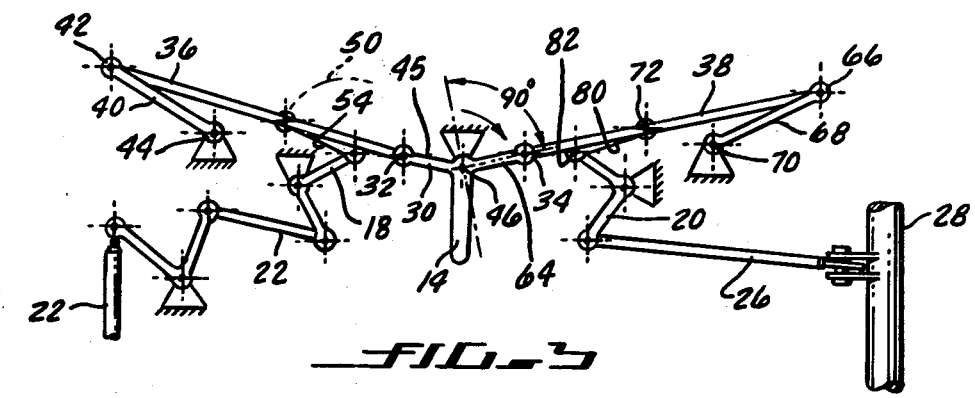
FIG_3
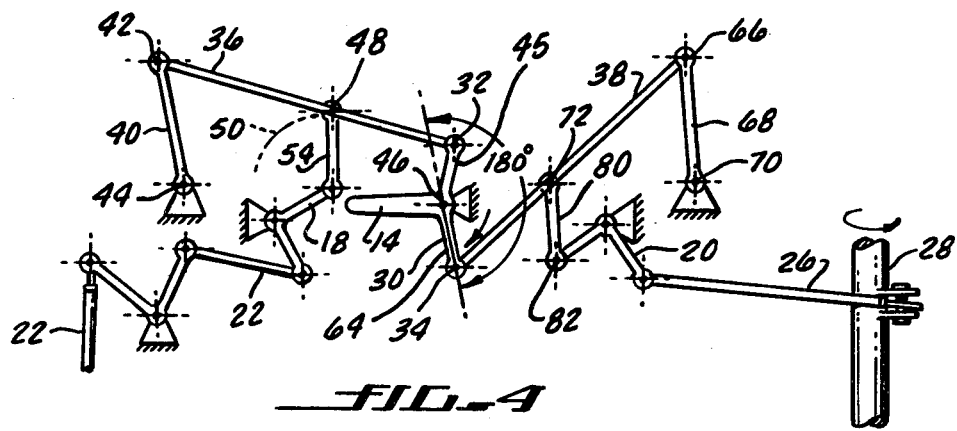
FIG_4

4,180,943

DUAL LOST MOTION MECHANISM FOR AN AIRCRAFT DOOR

BACKGROUND OF THE INVENTION

It is desirable that an aircraft door open by means of a single handle which unlatches the door and then commences its rotation toward its open position, or when open, rotates the door toward its closed position and then latches it when the aircraft again is to be pressurized. Previous designs to perform similar functions have used cams and cam followers which give rise to tolerance and production problems. It is desirable to eliminate all unneeded close tolerances in aircraft production so that the parts are more economical to manufacture and the adjustment requirements can be less precise, so less rigging time is required both in production and field operations.

SUMMARY OF THE INVENTION

The present door operating system is based on a pair of four-bar linkages, both operated by the main operating handle of the door. The particular four-bar linkage used includes an output crank and an input crank arm. By using two independent four-bar linkages driven by the main handle, the output cranks are sequenced during the input rotation of the handle. That is during 180° of rotation of the arms of the input crank, the output crank of each four-bar mechanism dwells for a different 90° of input rotation so that while one dwells, the other works, and vice versa. This sequence allows the functions of latch operation and door rotation to be performed in correct order, assuring a smooth operating door. Such a system is desirable for sequencing any door, hatch or plug, which has more than a simple latch and hinge arrangment.

It is therefore an object of the present invention to improve the door opening and closing mechanisms of aircraft doors.

Another object is to reduce the cost of door opening mechanisms.

Another object is to eliminate needlessly close tolerances and the rigging problems such tolerances create heretofore present in door sequencing mechanisms.

These and other objects and advantages of the present invention will become apparent to those skilled in the art after considering the following detailed specification which covers a preferred embodiment thereof in conjunction with the accompanying drawings wherein:

BRIEF DESCRIPTION OF THE DRAWINGS

FIG. 2 is a diagrammatic representation of the present mechanism when the handle connected to the input crank thereof is in its door closed position;

FIG. 3 is a view similar to FIG. 2 with the input crank rotated 90°;

FIG. 4 is a view similar to FIGS. 2 and 3 with the input crank rotated 180° from that of FIG. 2 so that the door is in its unlatched and rotated open position.

DETAILED DESCRIPTION OF THE SHOWN EMBODIMENT

Figure 1:
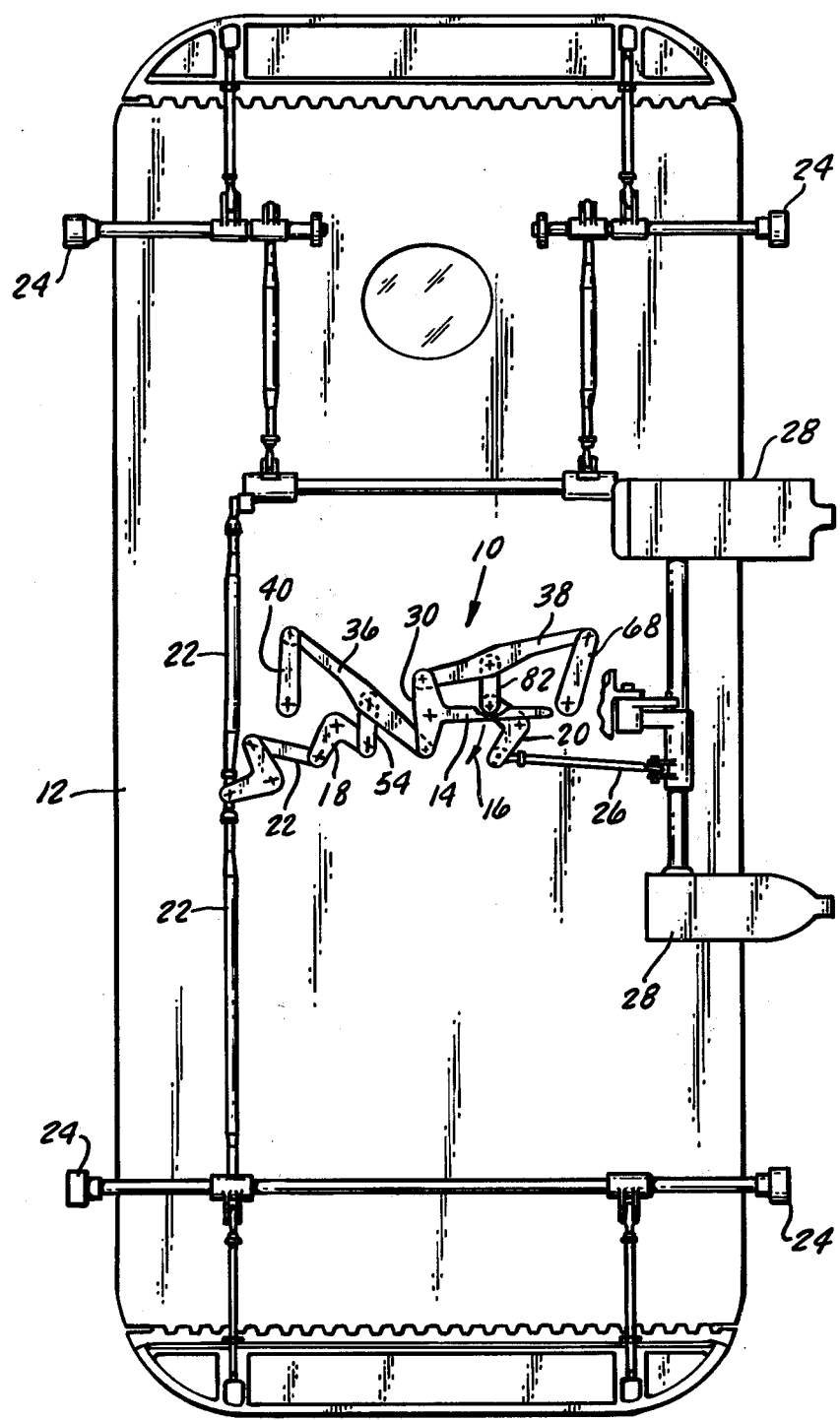
FIG. 1 is a simplified elevational view of an aircraft plug door showing the latch linkages, the hinge linkages, and the present mechanism for operating the same.

Referring to the drawings, more particularly by reference numbes, number 10 in FIG. 1 refers to the door sequencing mechanism of the present invention attached to and positioned on an aircraft door 12. The mechanism 10 includes an input handle 14 shown in its door closed and latched position. The handle 14 is normally rotated in the direction of arrow 16 to open the door 12 and in the opposite direction to the arrow 16 when it is desired to close the door 12. The output of the mechanism 10 is transferred to the door 12 by means of output bellcranks 18 and 20. The bellcrank 18 is connected by suitable linkage 22 to the latches 24 which engage portions of the aircraft fuselage to assure that the door 12 remains closed until such time as it is desired to open the door 12. The other output bellcrank 20 is connected by means of linkage 26 to the hinge members 28 of the door 12 so that output motion of the bellcrank 20 causes the door 12 to rotate.

Figure 5:
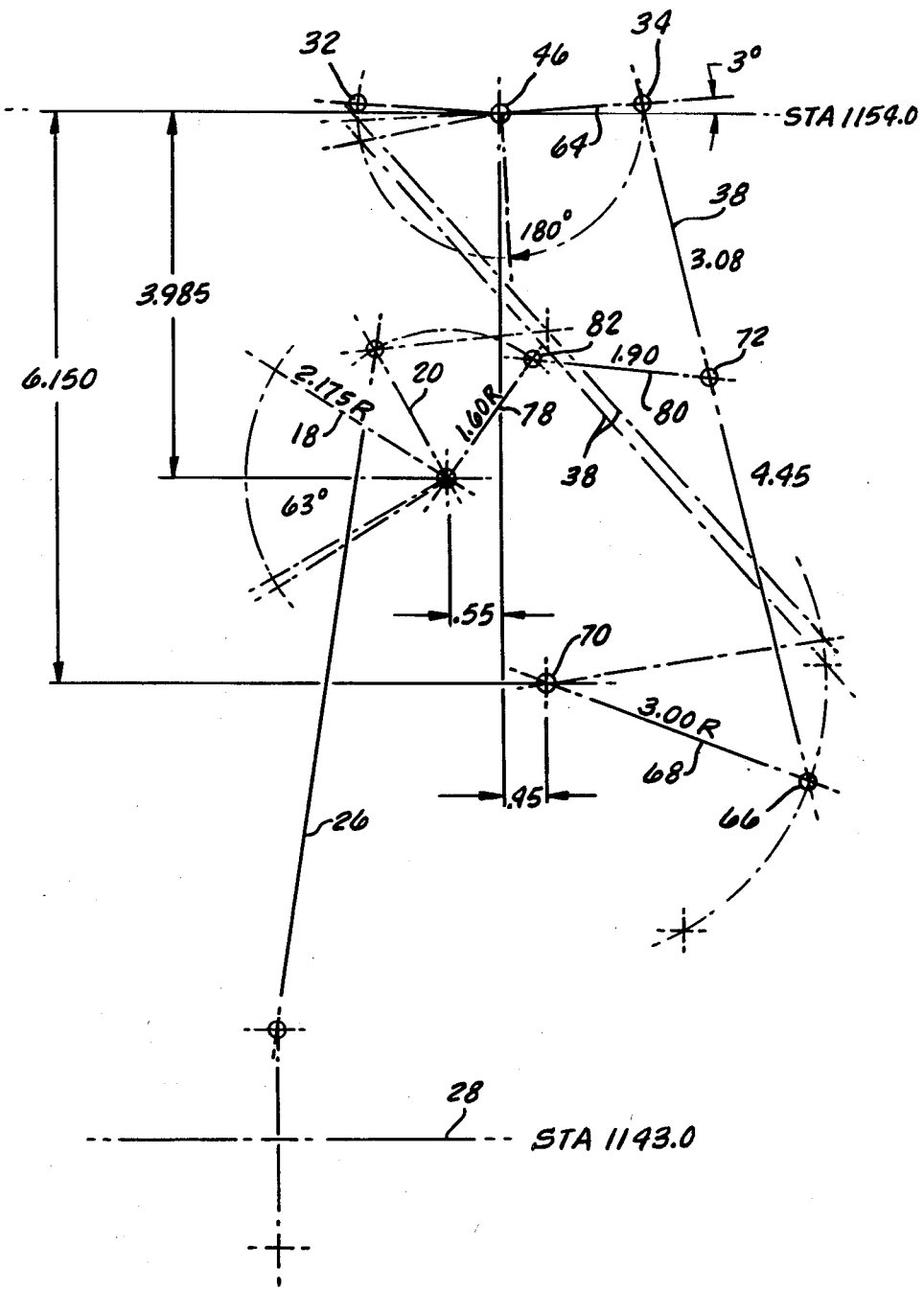
FIG. 5 is a dimensional diagram showing suitable linkage ratios and positions for an actual embodiment constructed according to the present invention.

The operation of the mechanism 10 can be seen more clearly by reference to FIGS. 2, 3 and 4. The input handle 14 is connected to apply torque to an input crank 30 which has output pivots 32 and 34 connected to link bars 36 and 38, respectively. The opposite end of link bar 36 is connected to a latch idler crank 40 at pivot 42, the crank 40 being connected to structure by means of pivot 44 which allows rotation thereof. The length of the crank 40 between the pivots 42 and 44 is longer than the length of the arm 45 of the input crank 30 from its rotational pivot 46 to pivot 32. Of course, the end of link bar 36 at the pivot 32 is restrained to move in a circular manner as is end 42. When the input crank radius and the latch idler crank 40 lengths are properly chosen (see for example FIG. 5) there is a point 48 along the link bar 36 which circumscribes almost a circular path 50 for a suitable number of degrees, which is 85° in the example of FIG. 5. From the position of the mechanism 10, shown in FIG. 3, to FIG. 4, or vice versa, the point 48 moves along the path 50 which causes the output link 54 connected to point 48 whose, length is the same as the radius of the path 50, to rotate about its opposite end pivot 56 which remains stationary. The output link 54 is connected at pivot 56 to the output bellcrank 18 which is pivoted to structure at pivot 60.

When the mechanism 10 moves from the position shown in FIG. 2 to that in FIG. 3, or vice versa, the point 48 moves along the relatively straight line path 62 which causes the output bellcrank 18 to rotate about pivot 60, thus causing the unlatching or latching of the latches 24 through the linkage 22. At the same time, the link bar 38 is moved through its connection by pivot 34 to the opposite arm 64 of the input crank 30. The opposite end of the link bar 38 is connected by means of a pivot 66 to a hinged idler crank 68 which is in turn connected to structure by pivot 70. Link bar 38, like bar 36, includes an output point 72 which like point 48 moves along a generally circular path 74 for a portion of the input handle 14 rotation and a relatively straight path 76 for the remainder thereof. The output point 72 is connected to the input arm 78 of the output bellcrank 20 by link 80 whose length to its pivot connection 82 which connects to arm 78 is the same as the radius of the path 74. Therefore, as the handle 14 rotates in the direction of arrow 16 for the first 90° of travel, the point 72 strays on the circular path 74 so that the hinge output bellcrank 20 does not move.

With reference to FIGS. 3 and 4, it can be seen that the latch portion of the mechanism 10 thereafter dwells for the remainder of the rotation of handle 14 in the direction of arrow 16, since point 48 travels along the circular path 50, thus retaining pivot 56 in a fixed position whereas point 72 thereafter travels along, generally linear path 76, producing an output to the hinge output crank 20 connected by linkage 26 to the hinge member 28.

When the handle 14 thereafter is moved in the reverse direction for about 180°, first the hinge members 28 are rotated relatively for the first 90° of handle rotation and thereafter the latching mechanism is engaged for the second 90° of handle rotation. It should be apparent that the same basic linkage is used for actuating both the latch and the hinge mechanisms with the dwell time of each mechanism reversed with respect to handle rotation. Close scrutiny also would show that the arms 45 and 64 of the input crank 30 are at a slight angle other than 180° to each other. This is because the latch and hinge mechanisms are tilted upwardly slightly with respect to each other to fit into the envelope available in the assignee's DC-9 door for which the mechanism was first designed. The relative lengths of the components described above were derived emperically to fit in an existing space in the door and are shown by way of example in FIG. 5.

Thus there has been shown and described a dual lost motion mechanism employing four bar linkages for one-point control of the opening and closing of an aircraft door which fulfills all the objects and advantages sought therefore. Many modification, variations and other uses and applications of the subject mechanism will, however, become apparent to those skilled in the art after considering the specification and the accompanying drawings. All such changes, modifications, alterations, and other uses and applications which do not depart from the spirit and scope of the invention are deemed to be covered by the invention which is limited only by the claims which follow.

What is claimed is:

1. A mechanism for opening and closing an aircraft door by operating latch means which are connected to latch and unlatch the door and by operating hinge means which are connected to rotate the door when it is unlatched, said mechanism including:

an input crank for the application of rotational movement to said mechanism;

latch output means connected to the latch means to operate them;

hinge output means connected to the hinge means to operate them;

a first four-bar linkage connected between said input crank and said latch output means, the output movement of said first four-bar linkage occurring during a first portion of rotation of said input crank rotation, said first four-bar linkage including:

a latch input crank arm of a predetermined length connected to said input crank to rotate therewith;

a latch idler crank arm of predetermined length pivotally connected to structure;

a latch link bar connected between said latch input crank arm and said latch idler crank arm, said latch link bar having at least one point therealong which moves in a generally circular path for said second portion of input crank rotation and a non-circular path during said first portion of said input crank rotation; and a latch output link connected between said latch link bar point and said latch output means to produce output motion thereof when said latch link bar point is moving along said non-circular path, and;

a second four-bar linkage connected between said input crank and said hinge output means, the output movement of said second four-bar linkage occuring during a second portion of rotation of said input crank rotation, said second four-bar linkage including:

a hinge input crank arm of a predetermined length connected to said input crank to rotate therewith;

a hinge idler crank arm of predetermined length pivotally connected to structure;

a hinge link bar connected between said hinge input crank arm and said hinge idler crank arm, said hinge link bar having at least one point therealong which moves in a generally circular path for said first portion of input crank rotation and a non-circular path during said second portion of said input crank rotation; and a hinge output link connected between said hinge link bar point and said hinge output means to produce output motion thereof when said hinge link bar point is moving along said non-circular path, said first and second portions of said input crank rotation each being about 90° of input crank rotation.

2. The mechanism defined in claim 1 wherein said first and second four-bar linkage have the same dimensions.

3. The mechanism defined in claim 1 wherein said non-circular path is essentially linear.

4. The mechanism defined in claim 1 wherein said latch input crank arm and said hinge input crank arm are connected together at less than 180°.

5. The mechanism defined in claim 1 wherein said hinge output link is longer than said hinge input crank arm and shorter than said hinge idler crank arm, said input crank including a handle adapted for the application of manual force to cause rotation thereof.

* * * * *